US012579949B2

(12) United States Patent
Takaya

(10) Patent No.: US 12,579,949 B2
(45) Date of Patent: Mar. 17, 2026

(54) IMAGE PROCESSING APPARATUS

(71) Applicant: SHARP KABUSHIKI KAISHA, Sakai City (JP)

(72) Inventor: Mamoru Takaya, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 198 days.

(21) Appl. No.: 18/430,973

(22) Filed: Feb. 2, 2024

(65) Prior Publication Data

US 2024/0282275 A1 Aug. 22, 2024

(30) Foreign Application Priority Data

Feb. 17, 2023 (JP) ................................ 2023-023385

(51) Int. Cl.
*G09G 3/34* (2006.01)

(52) U.S. Cl.
CPC ... *G09G 3/3426* (2013.01); *G09G 2340/0442* (2013.01); *G09G 2340/045* (2013.01)

(58) Field of Classification Search
CPC ..... G09G 2340/0442; G09G 2340/045; G09G 3/3426
See application file for complete search history.

(56) References Cited

U.S. PATENT DOCUMENTS 5,386,236 A 1/1995 Hong
2021/0334547 A1 * 10/2021 Cohen-Tidhar ........ G06V 10/82

FOREIGN PATENT DOCUMENTS

JP H06-86240 A 3/1994
JP H08255255 A * 10/1996
JP 2009268018 A * 11/2009

* cited by examiner

*Primary Examiner* — Yingchun He
(74) *Attorney, Agent, or Firm* — ScienBiziP, P.C.

(57) ABSTRACT

An image processing apparatus includes an image generator and a display adjuster. The image generator generates a content image. The display adjuster adjusts an aspect ratio of the content image. The content image is divided into plural partial content areas. The content image is displayed on a display screen. A predetermined adjustment priority is set for each of the partial content areas. The display adjuster adjusts the aspect ratio of the content image by changing an aspect ratio for each of the partial content areas on the basis of the adjustment priority.

10 Claims, 10 Drawing Sheets

IMAGE PROCESSING APPARATUS

INCORPORATION BY REFERENCE

This application claims the benefit of priority under U.S.C. 119 based on Japanese Patent Application No. 2023-023385 filed on Feb. 17, 2023, the entire contents of which are incorporated herein by reference.

BACKGROUND

The present disclosure relates to an image processing apparatus.

In a certain document, a screen aspect ratio conversion method for a television is described. In the method, an input video signal having a screen aspect ratio of 4:3 is displayed on a video apparatus having a screen aspect ratio of 16:9. In the screen aspect ratio conversion method described in the document, predetermined numbers of upper and lower scanning lines (for example, 30 lines each from an upper side and a lower side) are deleted from the input video signal having the screen aspect ratio of 4:3 (4 in a horizontal dimension to 3 in a vertical dimension). Then, the input video signal is time-compressed in a horizontal direction and thereafter displayed on a screen having the screen aspect ratio of 16:9 (16 in the horizontal dimension of 16 to 9 in the vertical dimension).

SUMMARY

According to an aspect of the present disclosure, an image processing apparatus includes an image generator and a display adjuster. The image generator generates a content image. The display adjuster adjusts an aspect ratio of the content image. The content image is divided into plural partial content areas. The content image is displayed on a display screen. A predetermined adjustment priority is set for each of the partial content areas. The display adjuster adjusts the aspect ratio of the content image by changing an aspect ratio for each of the partial content areas on the basis of the adjustment priority.

DETAILED DESCRIPTION

Figure 1:
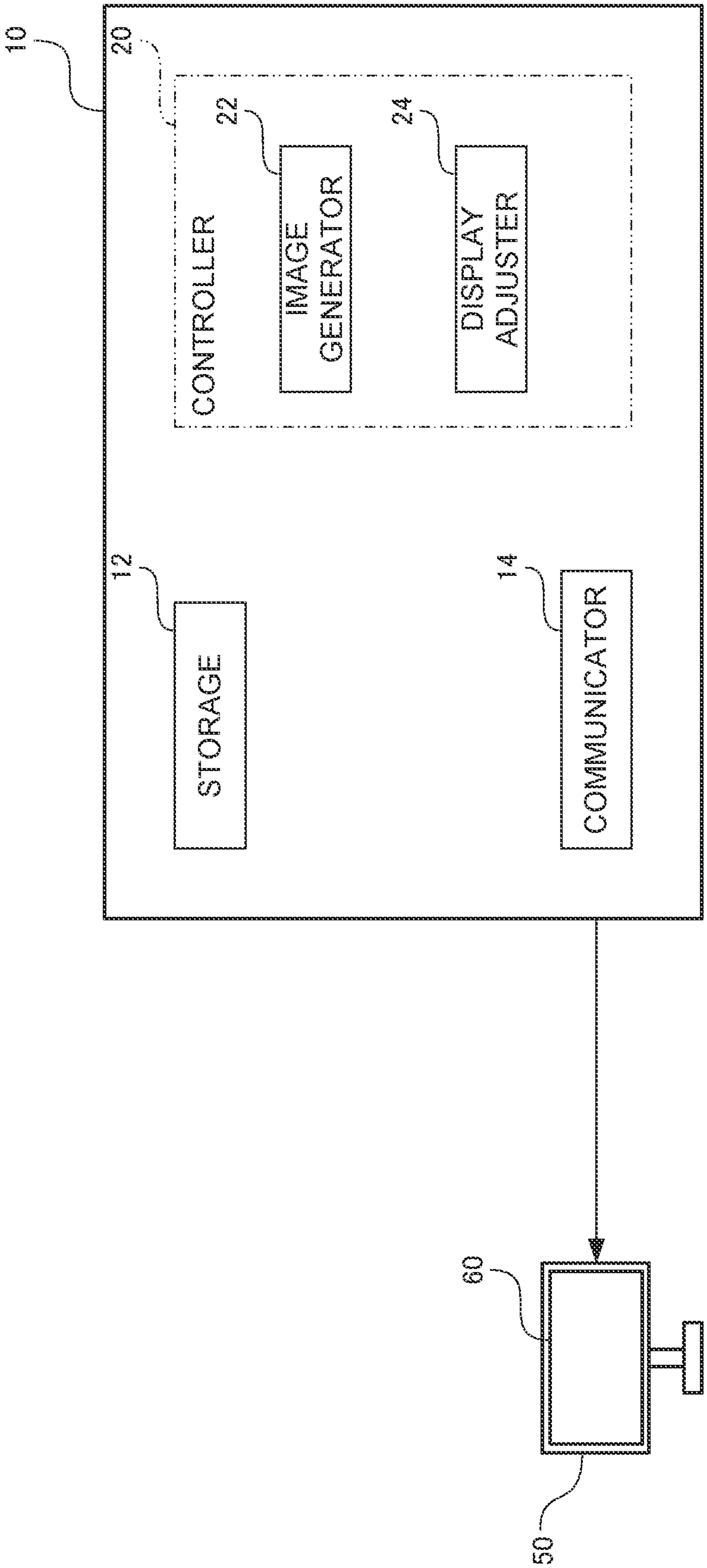
FIG. 1 is a configuration view schematically illustrating an exemplary configuration of an image processing apparatus.

A description will hereinafter be made on an embodiment with reference to the drawings. In the drawings, the same or corresponding portions will be denoted by the same reference signs, and the description thereon will not be repeated.

First, a description will be made on a configuration of an image processing apparatus 10 with reference to FIG. 1. FIG. 1 is a configuration view schematically illustrating an exemplary configuration of the image processing apparatus 10. The image processing apparatus 10 includes a storage 12, a communicator 14, and a controller 20. The controller 20 includes an image generator 22 and a display adjuster 24. The image processing apparatus 10 in FIG. 1 can communicate with a display 50. The display 50 has a display screen 60.

The image processing apparatus 10 is mounted, for example, as a part of a personal computer (PC) or a smartphone. Alternatively, the image processing apparatus 10 may be a server.

The storage 12 stores various types of data, such as program data, required for operation of the image processing apparatus 10. The data stored in the storage 12 includes content data such as character data and image data. The storage 12 includes a storage device such as random access memory (RAM) or read only memory (ROM).

The communicator 14 relays data transmission/reception between the image processing apparatus 10 and another device (in particular, the display 50). The communicator 14 is a communication interface unit that performs communication conforming to a communication standard, such as a High-Definition Multimedia Interface (HDMI®) standard, used for the transmission/reception of the data including images and videos. For example, the communicator 14 receives the content data and the like from the outside of the image processing apparatus 10 (a server on the Internet, or the like) and stores the content data and the like in the storage 12. For example, the communicator 14 transmits, to the display 50, the data of the image to be displayed on the display screen 60.

The controller 20 includes a processor such as a central processing unit (CPU) or an application specific integrated circuit (ASIC). For example, when the processor of the controller 20 executes a program stored in the storage 12, the processor functions as the image generator 22 and the display adjuster 24. The controller 20 may include the plural processors. For example, the processor that implements a function as the image generator 22 and the processor that executes a function as the display adjuster 24 may be provided separately.

The image generator 22 generates a content image to be displayed on the display screen 60. The content image is an image that is divided into plural partial content areas. For example, the image generator 22 combines plural pieces of content data stored in the storage 12 to generate the content image in which a content corresponding to each piece of the content data is displayed in the respective partial content area.

The display adjuster 24 adjusts an aspect ratio of the content image generated by the image generator 22. For example, the display adjuster 24 adjusts the aspect ratio of the content image by reducing, enlarging, or partially deleting the content image.

The display 50 in FIG. 1 is a device that has the display screen 60 capable of displaying the image. The display 50 is a liquid-crystal display, for example. The display screen 60 is a liquid-crystal panel provided in the liquid crystal display, for example. The display 50 may be a television receiver, for example. Alternatively, the display 50 may be a digital signage device that collectively displays plural contents such as advertisements.

Figure 2:
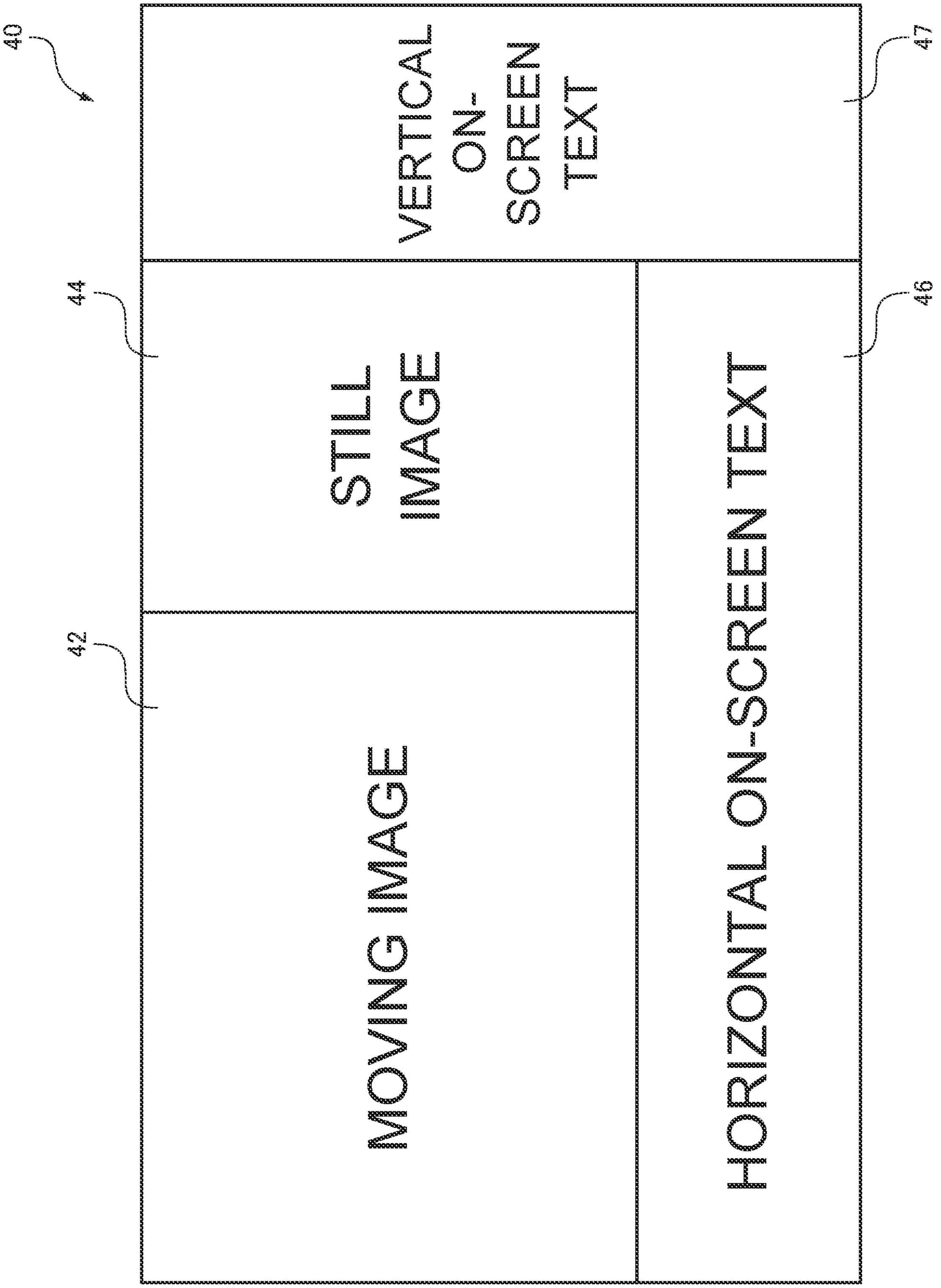
FIG. 2 is a view illustrating an example of a content image.

Next, a description will be made on an example of a content image 40 generated by the image generator 22 with reference to FIG. 1 and FIG. 2. FIG. 2 is a view illustrating an example of the content image 40. The content image 40 is divided into plural partial content areas. In FIG. 2, the content image 40 includes, as the plural partial content areas, a moving image area 42, a still image area 44, a horizontal on-screen text area 46, and a vertical on-screen text area 47.

The moving image area 42 is an area where a moving image is displayed. For example, a movie, a news video, and the like are displayed in the moving image area 42. The still image area 44 is an area where a still image is displayed. For example, an advertisement image, a weather map, and the like are displayed in the still image area 44.

The horizontal on-screen text area 46 is an area where a horizontal on-screen text is displayed. The horizontal on-screen text in FIG. 2 is a character string in which plural characters are arranged in the horizontal direction. The horizontal on-screen text may be displayed still in the horizontal on-screen text area 46, or may be displayed in a moved (scrolled) state in the horizontal on-screen text area 46. In the horizontal on-screen text area 46, for example, subtitles corresponding to the content in the moving image area 42, or the like is displayed.

The vertical on-screen text area 47 is an area where a vertical on-screen text is displayed. The vertical on-screen text in FIG. 2 is a character string in which plural characters are arranged in the vertical direction. The vertical on-screen text may be displayed still in the vertical on-screen text area 47, or may be displayed in the moved (scrolled) state in the vertical on-screen text area 47. In the vertical on-screen text area 47, for example, subtitles corresponding to the content in the still image area 44, or the like is displayed. In the following description, the horizontal on-screen text area 46 and the vertical on-screen text area 47 may collectively be referred to as an "on-screen text area".

In the content image 40 illustrated in FIG. 2, the moving image area 42 is arranged in an upper left portion of the content image 40. The still image area 44 is arranged on the right of the moving image area 42. The horizontal on-screen text area 46 is arranged under the moving image area 42 and the still image area 44. The vertical on-screen text area 47 is arranged on the right of the still image area 44 and the horizontal on-screen text area 46.

For example, in the case where the storage 12 stores moving image data, still image data, and plural types of the character data are included in the storage 12, the image generator 22 generates the content image 40 including the moving image area 42, the still image area 44, the horizontal on-screen text area 46, and the vertical on-screen text area 47 as illustrated in FIG. 2. The content image 40 is generated as an image having a predetermined aspect ratio. An aspect ratio of the content image 40 is 16:9 (16 in a horizontal dimension to 9 in a vertical dimension), for example.

Figure 3:
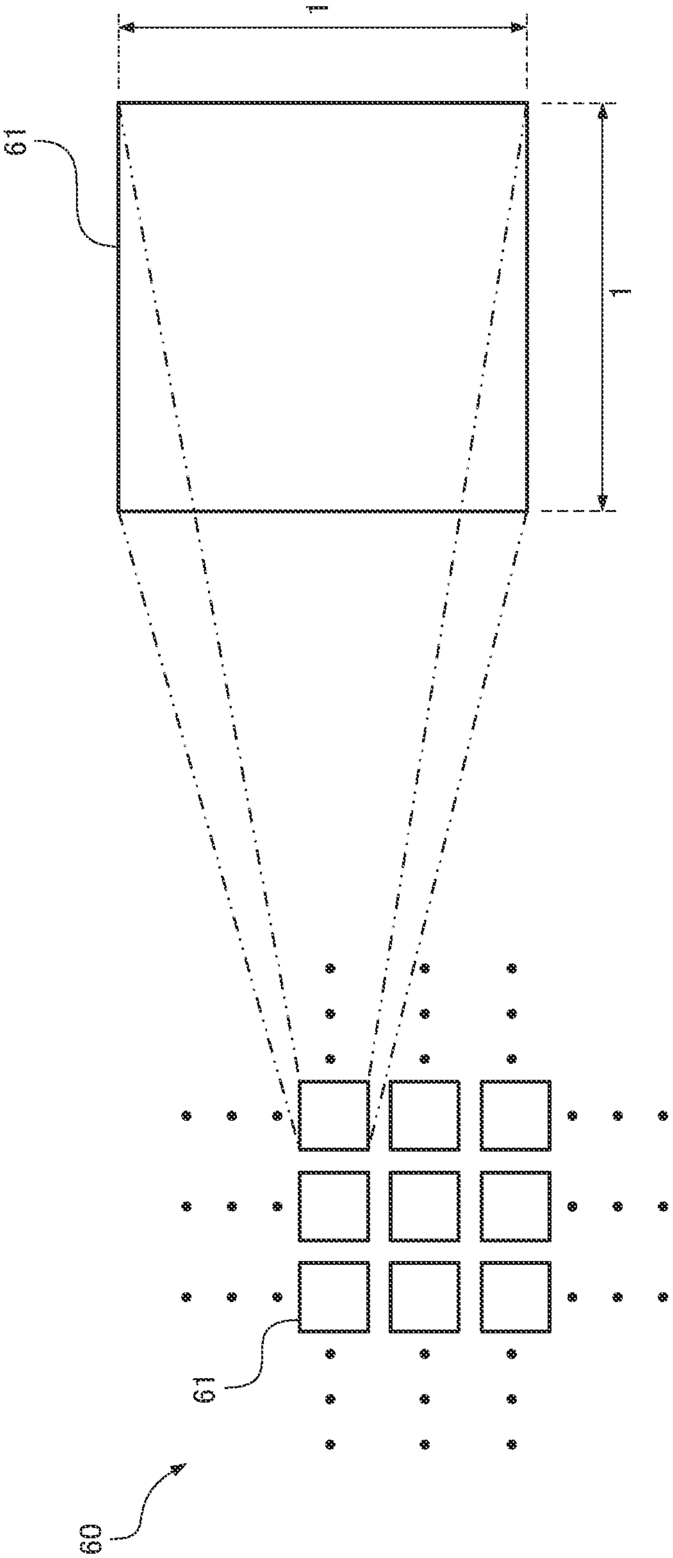
FIG. 3 is a view illustrating an example of plural pixels in a display screen.
Figure 4:
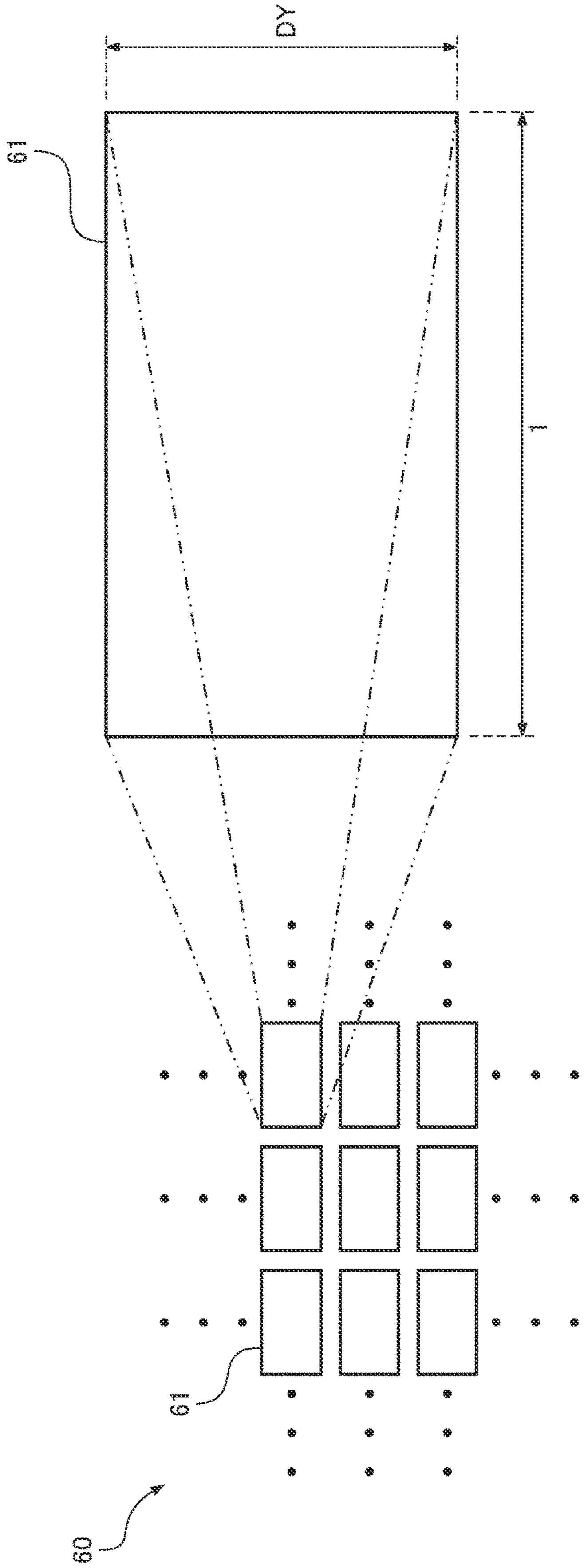
FIG. 4 is a view illustrating another example of the plural pixels in the display screen.

The data of the content image 40 generated by the image generator 22 is transmitted to the display 50 via the communicator 14. The display 50 displays the transmitted content image 40 on the display screen 60. However, depending on a characteristic of the display screen 60, the content image 40 may not be displayed appropriately (the content image 40 may not be displayed as intended by a creator of the content data on which the content image 40 is based). Next, a description will be made on an example of a case where the content image 40 is not displayed appropriately with reference to FIG. 1, FIG. 2, FIG. 3, and FIG. 4. FIG. 3 is a view illustrating an example of plural pixels 61 in the display screen 60. FIG. 4 is a view illustrating another example of the plural pixels 61 in the display screen 60. For example, in the case where an aspect ratio of each of the pixels 61 of the display screen 60 is not 1:1, the content image 40 is not displayed appropriately.

In the display 50 such as the liquid-crystal display, the display screen 60 generally includes the plural pixels 61. As illustrated in FIG. 3, in the display screen 60, the pixels 61 are arranged in the vertical direction and the horizontal direction. For example, the number of the pixels 61 is 1080 in the vertical direction and 1920 in the horizontal direction in the display screen 60 having an aspect ratio of 16:9 (9 in the vertical dimension to 16 in the horizontal dimension).

The pixel 61 illustrated in FIG. 3 has a square shape with a ratio of length to width (the aspect ratio) of 1:1. In the case where the aspect ratio of the pixel 61 is square, the content image 40 is displayed appropriately on the display screen 60 (the content image 40 is displayed as intended by the creator of the content data on which the content image 40 is based).

However, for example, as illustrated in FIG. 4, there is a case where the aspect ratio of the pixel 61 is not 1:1. In FIG. 4, the ratio of length to width of the pixel 61 is DY:1, and DY is a smaller numerical value than 1. Depending on the type of the display 50, the display screen 60 may be designed to have the pixel 61 that is not square (whose aspect ratio is not 1:1). In addition, even when the display screen 60 is designed to have the square pixel 61, the aspect ratio of the pixel 61 may deviate from 1:1 due to an individual difference of the display 50. FIG. 4 illustrates the pixel 61, whose vertical dimension is clearly smaller than the horizontal dimension, for the description. However, in the case where the aspect ratio of the pixel 61 deviates from 1:1 due to the individual difference, there is only a slight difference between the vertical dimension and the horizontal dimension. For example, there is a case where the aspect ratio is about 0.95:1.

In the case where the aspect ratio of the pixel 61 is not 1:1, the content image 40 is not displayed appropriately. For example, in the case where the ratio of length to width of the pixel 61 is 0.95:1, the content image 40 is displayed as an image that is reduced in the vertical direction from the original display thereof. More specifically, for example, a perfect circle included in the content image 40 is displayed as a horizontally long ellipse having 1 in the horizontal dimension to 0.95 in the vertical dimension.

Numerical information on the aspect ratio of the pixel 61 in the display screen 60 is confirmed at the time of manufacturing the display 50 and is stored in a storage (in particular, nonvolatile memory such as flash memory) of the display 50. For example, information on the pixel 61 is preferably included in a part of Extended Display Identification Data (EDID) that indicates information on an operation setting of the display 50.

The display adjuster 24 of the image processing apparatus 10 adjusts the aspect ratio of the content image 40 such that the content image 40 is appropriately displayed on the display screen 60. For example, the display adjuster 24 receives the numerical information on the aspect ratio of the pixel 61 from the display 50 and adjusts the aspect ratio of the content image 40 according to the aspect ratio of the pixel 61.

For example, in the case where the ratio of length to width of the pixel 61 is 0.95:1, the display adjuster 24 enlarges (stretches) the content image 40 by 100/95 times in the vertical direction. The content image 40 enlarged by 100/95 times in the vertical direction is appropriately displayed in terms of a shape thereof on the display screen 60 having the pixel 61 whose ratio of length to width is 0.95:1. For example, the perfect circle included in the content image 40 is also displayed as the perfect circle on the display screen 60.

Figure 5:
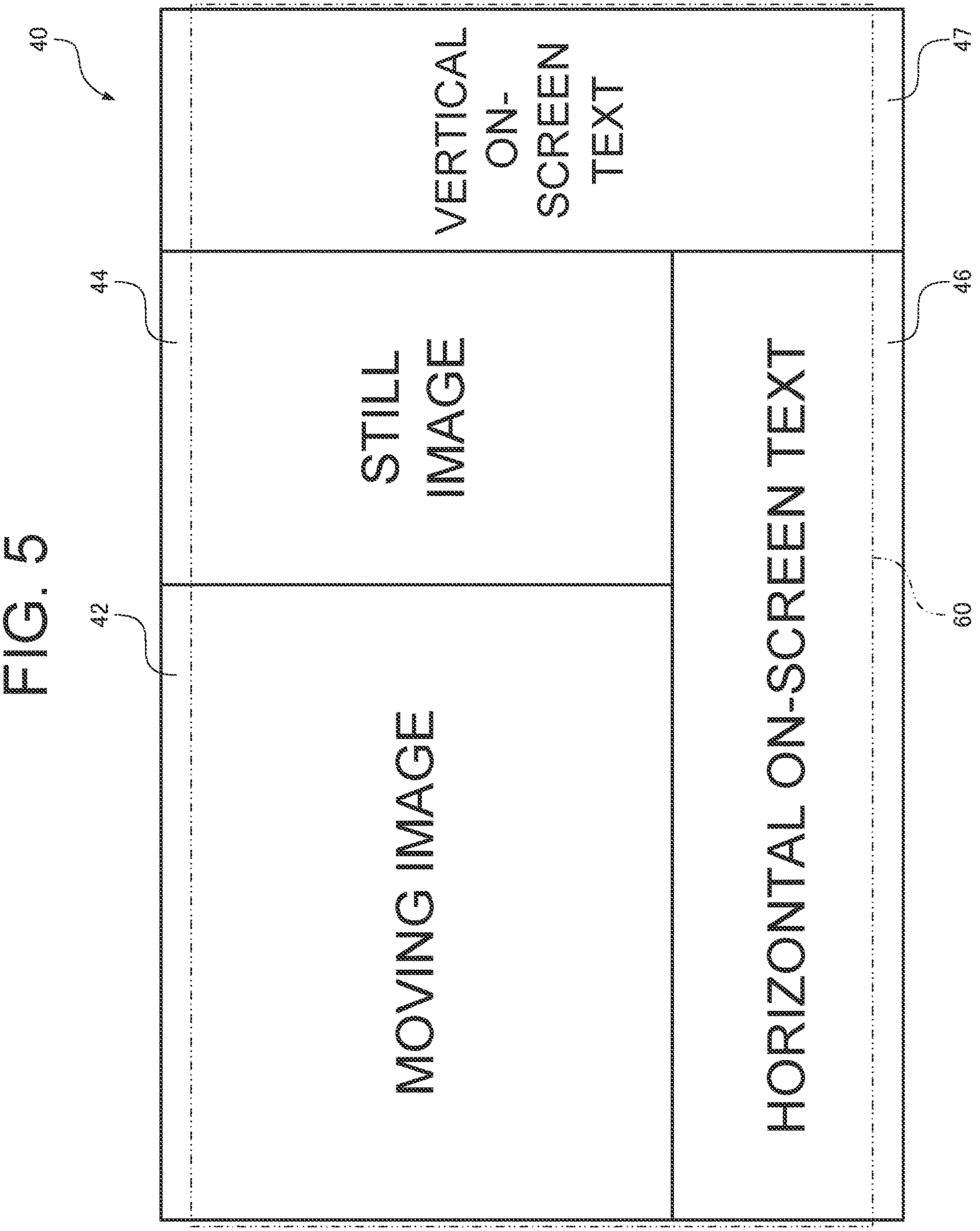
FIG. 5 is a view illustrating an example of a relationship between the display screen and the content image.

However, a part of the content image 40 enlarged in the vertical direction is not displayed on the display screen 60. A description will be made on that the part of the content image 40 enlarged in the vertical direction by the display adjuster 24 is not displayed on the display screen 60 with reference to FIG. 1 and FIG. 5. FIG. 5 is a view illustrating an example of a relationship between the display screen 60 and the content image 40.

As illustrated in FIG. 5, the aspect ratio of the content image 40 enlarged in the vertical direction does not match the aspect ratio of the display screen 60, and the vertical dimension of the content image 40 is larger than that of the display screen 60. When the content image 40, which has been adjusted to be enlarged only in the vertical direction, is displayed on the display screen 60, a part of an upper portion and a part of a lower portion of the content image 40 are not displayed on the display screen 60. In FIG. 5, parts of upper portions of the moving image area 42, the still image area 44, and the vertical on-screen text area 47 are located outside a range of the display screen 60. As a result, parts of the moving image area 42, the still image area 44, and the vertical on-screen text area 47 are not displayed on the display screen 60. In particular, since the moving image area 42 often indicates important information in the content image 40, it is not preferable that the part of the moving image area 42 is not displayed.

Meanwhile, in the lower portion of the content image 40, parts of lower portions of the horizontal on-screen text area 46 and the vertical on-screen text area 47 are located outside the range of the display screen 60. As a result, the parts of the lower portions of the horizontal on-screen text area 46 and the vertical on-screen text area 47 are not displayed. However, the on-screen text areas (the horizontal on-screen text area 46 and the vertical on-screen text area 47) often indicate relatively less important information of the content image 40. In particular, even in the case where a blank space (a portion in which the character string is not displayed) in the on-screen text area is not displayed on the display screen 60, information to be given out to a viewer is not changed in many cases.

The display adjuster 24 of the image processing apparatus 10 adjusts the aspect ratio differently for each of the partial content areas (in FIG. 5, the moving image area 42, the still image area 44, the horizontal on-screen text area 46, and the vertical on-screen text area 47) such that the information conveyed by the content image 40 is lost as little as possible. More specifically, a predetermined adjustment priority is set for each of the partial content areas, and the display adjuster 24 changes the aspect ratio for each of the partial content areas on the basis of the adjustment priority. In the image processing apparatus 10, the aspect ratio is changed for each of the partial content areas on the basis of the adjustment priority. Thus, appropriate aspect ratio adjustment processing is executed according to the content of the content image 40. The adjustment priority is determined according to a property of the partial content area. For example, the higher adjustment priority is preferably set for the partial content area of less importance. Then, in the case where the aspect ratio of the content image 40 does not match the aspect ratio of the display screen 60, the display adjuster 24 preferentially changes the aspect ratio of the partial content area having a high adjustment priority, so as to make the aspect ratio of the content image 40 match the aspect ratio of the display screen 60. The image processing apparatus 10 preferentially changes the aspect ratio of the partial content area having a high adjustment priority and can thereby change the aspect ratio according to the importance of each of the partial content areas.

Figure 6:
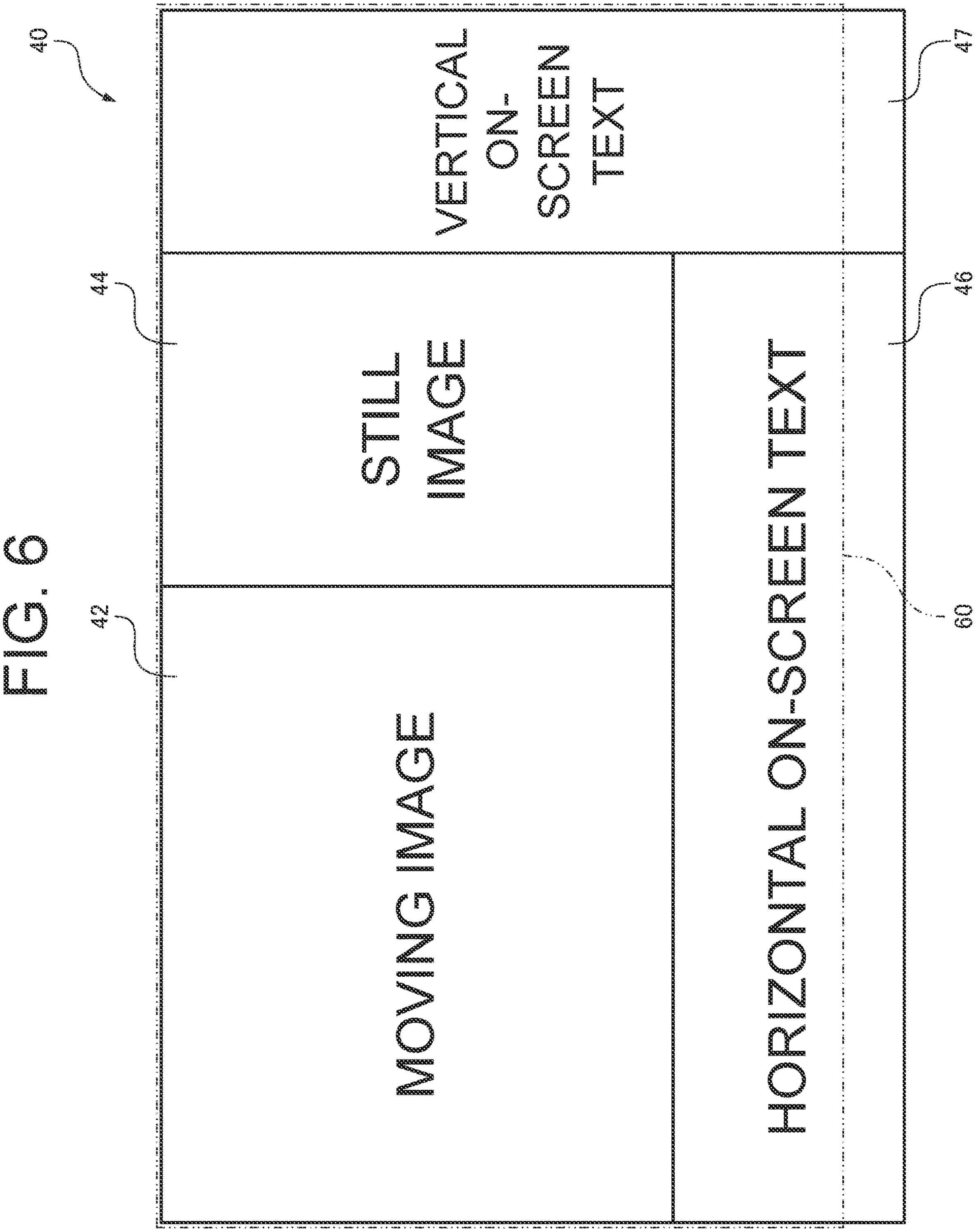
FIG. 6 is a view illustrating a state where a part of an on-screen text image is deleted.

A description will be made on that the aspect ratio is significantly changed for the partial content area having a high adjustment priority with reference to FIG. 1, FIG. 4, FIG. 5, and FIG. 6. FIG. 6 is a view illustrating a state where a part of the on-screen text image is deleted in the on-screen text area. In FIG. 6, the partial content areas having the highest adjustment priority are the on-screen text areas (the horizontal on-screen text area 46 and the vertical on-screen text area 47) where the on-screen text image is displayed. Due to the highest adjustment priority of the on-screen text area, the aspect ratio of the on-screen text area of relatively low importance is preferentially changed. Thus, when the aspect ratio of the content image 40 is adjusted, the information included in the content image 40 is less likely to be damaged.

The display adjuster 24 changes the aspect ratio of each of the partial content areas according to the aspect ratio of the pixel 61. The display adjuster 24 makes a significant change on the aspect ratio particularly for the on-screen text area having a high adjustment priority. More specifically, the display adjuster 24 changes the aspect ratio of the on-screen text area by reducing, enlarging, or partially deleting the on-screen text image. In particular, the display adjuster 24 preferably changes the aspect ratio of the on-screen text area by reducing, enlarging, or partially deleting the blank space in the on-screen text area. Even in the case where the on-screen text image (particularly, a portion corresponding to the blank space) in the on-screen text area is reduced, enlarged, or partially deleted, the viewer only develops a little sense of discomfort, and the information included in the content image 40 is not changed. Thus, the display adjuster 24 can appropriately adjust the aspect ratio of the content image 40 without losing the information included in the content image 40.

FIG. 6 illustrates a case where the content image 40 becomes larger than the display screen 60 as a result of a fact that only the aspect ratio of each of the partial content areas is changed according to the aspect ratio of the pixel 61 (for example, the enlargement by 100/95 times in the vertical direction). In FIG. 6, the display adjuster 24 deletes a part of the on-screen text image located outside the range of the display screen 60. Alternatively, the display adjuster 24 reduces the on-screen text image in the vertical direction such that the part of the on-screen text image located outside the range of the display screen 60 fits within the display screen 60.

In the case where the higher adjustment priority is set for the partial content area of less importance, the display adjuster 24 changes the aspect ratio according to the importance of the partial content area. Accordingly, a scale of the change in the aspect ratio is small for the partial content area of high importance (the moving image area 42 and the like) while the scale of the change in the aspect ratio is large for the partial content area of low importance (the on-screen text area and the like). When the aspect ratio is significantly changed for the moving image area 42 (the area of high importance), the viewer develops the strong sense of discomfort. Meanwhile, when the aspect ratio is significantly changed for the on-screen text area (the area of low importance), the viewer develops the little sense of discomfort. Thus, the image processing apparatus 10 can appropriately display the content image 40 on the display screen 60 without giving the sense of discomfort to the viewer and without losing the information included in the content image 40. That is, in the image processing apparatus 10, when the aspect ratio of the content image 40 is adjusted, the appropriate aspect ratio adjustment processing is executed according to the content of the content image 40.

There is also a case where the content image 40 becomes smaller than the display screen 60 as a result of the fact that only the aspect ratio of the content image 40 is changed according to the aspect ratio of the pixel 61. For example, in the case where each of the partial content areas is reduced in the vertical direction, the entire content image 40 is reduced in the vertical direction. Then, the content image 40 becomes smaller than the display screen 60. In the case where the aspect ratio of the content image 40 does not match the aspect ratio of the display screen 60 as a result of the reduction of the entire content image 40 in the vertical direction, the display adjuster 24 preferably changes the aspect ratio of the on-screen text area by enlarging the on-screen text image in the on-screen text area in the vertical direction.

The partial content area having the second highest adjustment priority after the on-screen text area is the still image area 44 where the still image is displayed. In the case where it is difficult to make the aspect ratio of the content image 40 match the aspect ratio of the display screen 60 only by changing the aspect ratio of the on-screen text area, the display adjuster 24 can also change the aspect ratio of the still image area 44.

For example, in the case where the aspect ratio of the pixel 61 significantly deviates from 1:1, or in the case where the content image 40 having the aspect ratio of 4:3 is displayed on the display screen 60 having the aspect ratio of 16:9, the display adjuster 24 has to make the significant adjustment in the aspect ratio of the content image 40. In the case where the display adjuster 24 makes the significant adjustment in the aspect ratio of the content image 40 and only changes the aspect ratio of the on-screen text area, the on-screen text area becomes extremely large or extremely small. The content image 40 with the extremely large or extremely small on-screen text area possibly gives the sense of discomfort to the viewer. By changing the aspect ratio not only for the on-screen text area but also for the still image area 44, the display adjuster 24 can lessen the sense of discomfort given to the viewer by the content image 40. Since the adjustment priority of the still image area 44 is lower than that of the on-screen text area, the scale of the change in the aspect ratio of the still image area 44 is preferably smaller than the scale of the change in the aspect ratio of the on-screen text area.

The display adjuster 24 may change the aspect ratio of the on-screen text area by reducing, enlarging, or partially deleting the on-screen text image after reducing or enlarging a character size in the on-screen text image. By reducing, enlarging, or partially deleting the on-screen text image after reducing or enlarging the character size in the on-screen text image, the display adjuster 24 can change the aspect ratio of the on-screen text area without changing the information indicated in the on-screen text area.

Figure 7:
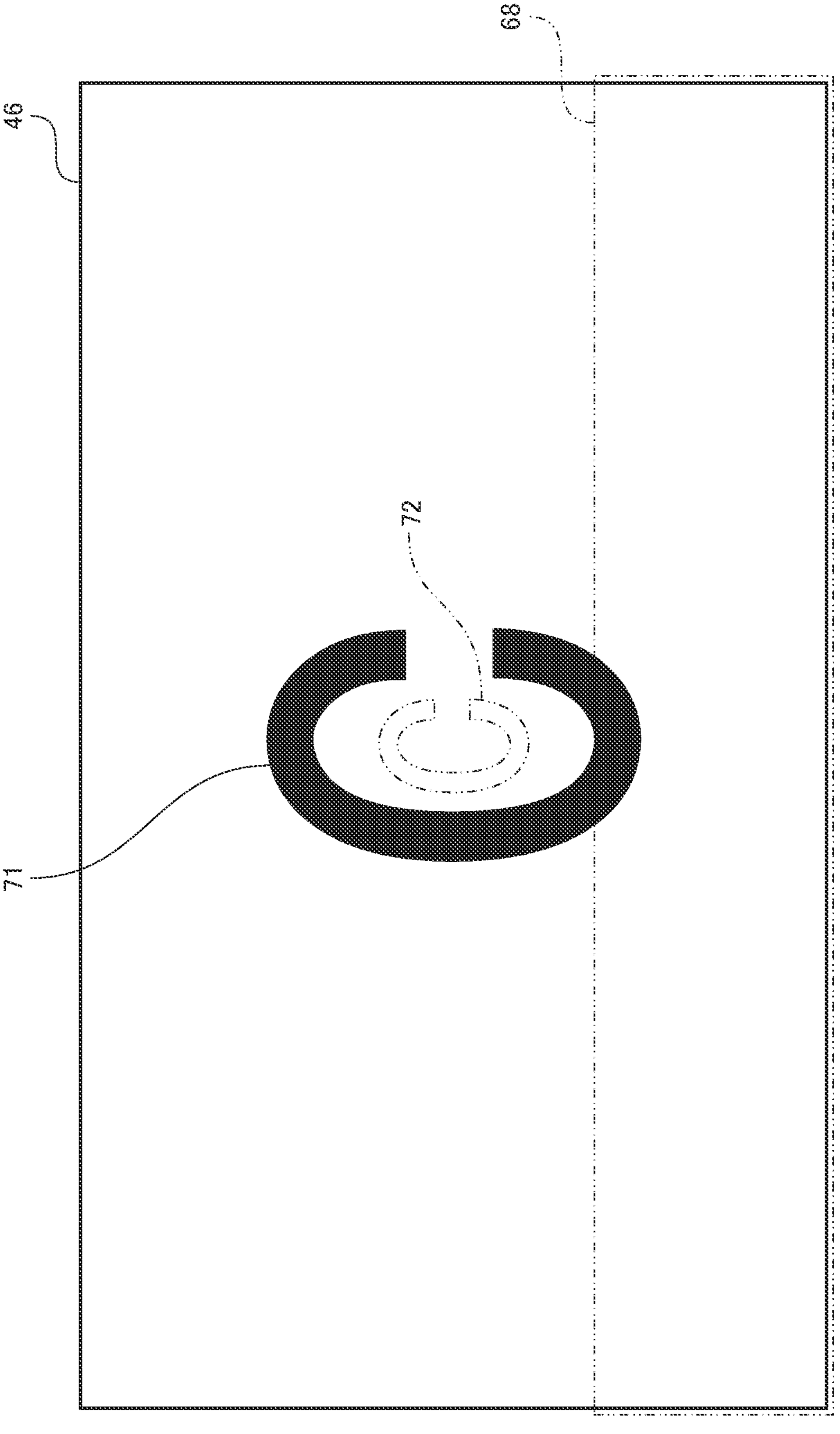
FIG. 7 is view illustrating an example of a character included in the on-screen text image.

As an example, a description will be made on a case where the character size of the on-screen text image in the horizontal on-screen text area 46 is reduced with reference to FIG. 1, FIG. 6, and FIG. 7. FIG. 7 is view illustrating an example of a character 71 included in the on-screen text image. FIG. 7 only illustrates the horizontal on-screen text area 46 for a purpose of the description. For example, when the display adjuster 24 adjusts the aspect ratio of the horizontal on-screen text area 46 by deleting a deletion range 68 (a part of the horizontal on-screen text area 46) located in a lower portion of the horizontal on-screen text area 46, there is a case where a part of the character 71 of the on-screen text image is included in the deletion range 68.

When the deletion range 68 is deleted together with the part of the character 71, the information indicated in the horizontal on-screen text area 46 is possibly changed. In the case where it is assumed that the part (or a whole) of the character 71 is included in the deletion range 68, the display adjuster 24 reduces the character size of the character 71 and thereby changes the character 71 to a small-sized character 72, so as to prevent the change in the information indicated in the horizontal on-screen text area 46. The small-sized character 72 is no longer included in the deletion range 68. Thus, by deleting the deletion range 68 after reducing the character size of the character 72, the display adjuster 24 can change the aspect ratio of the horizontal on-screen text area 46 without changing the information indicated in the horizontal on-screen text area 46. Instead of deleting the deletion range 68 after reducing the character size of the character 72, the display adjuster 24 may reduce the size of the on-screen text image in the horizontal on-screen text area 46 such that the deletion range 68 fits within the display screen 60.

In the case where it is necessary to enlarge the horizontal on-screen text area 46, the display adjuster 24 may enlarge the character 72 of the on-screen text image and then enlarge the on-screen text image in the horizontal on-screen text area 46. When the character 72 of the on-screen text image is enlarged and then the on-screen text image in the horizontal on-screen text area 46 is enlarged, a size ratio between the character 72 and the blank space in the enlarged on-screen text image becomes equal to the ratio in the on-screen text image before the enlargement. Thus, the viewer hardly develops the sense of discomfort. Also, in regard to the vertical on-screen text area 47, the display adjuster 24 may change the aspect ratio of the vertical on-screen text area 47 by reducing, enlarging, or partially deleting the on-screen text image after reducing or enlarging the character size of the on-screen text image.

Figure 8:
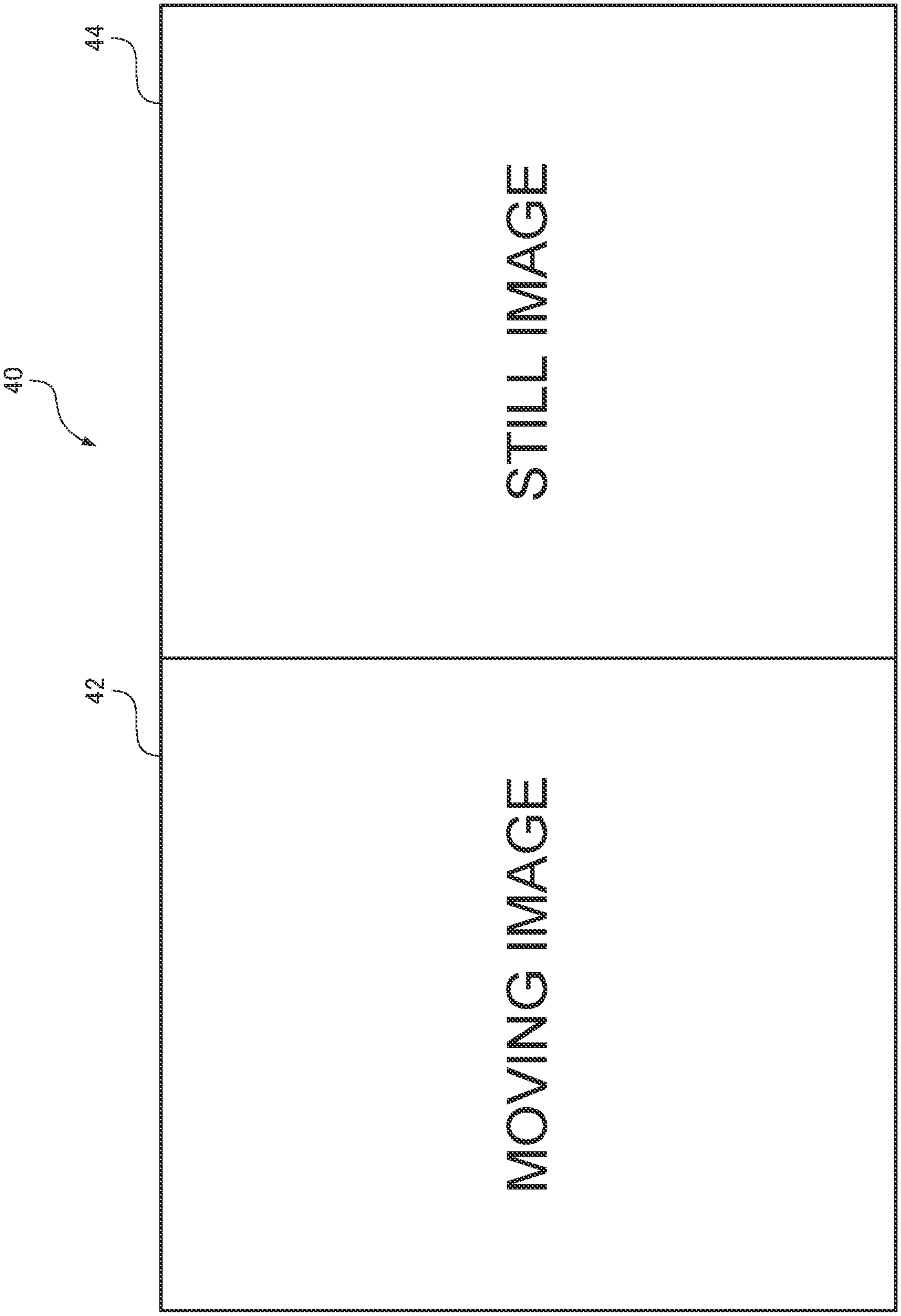
FIG. 8 is a view illustrating an example of the content image that includes a moving image area and a still image area.
Figure 9:
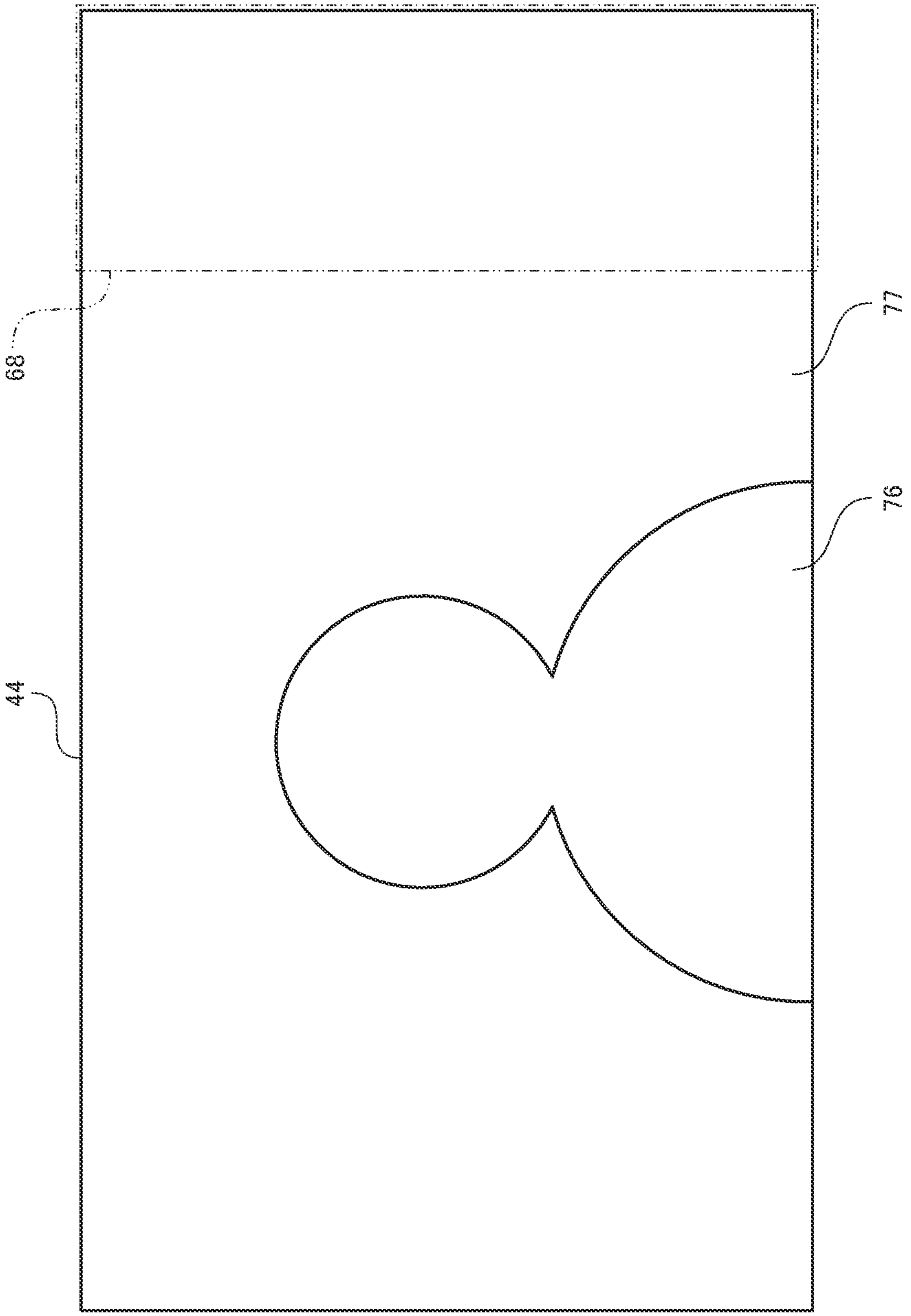
FIG. 9 is a view illustrating a state where a part of a background portion in the still image area is deleted.

Next, a description will be made on the change of the aspect ratio in the still image area 44 with reference to FIG. 1, FIG. 8, and FIG. 9. FIG. 8 is a view illustrating an example of the content image 40 that includes the moving image area 42 and the still image area 44. FIG. 9 is a view illustrating a state where a part of a background portion 77 in the still image area 44 is deleted. In FIG. 8, the content image 40 does not include the on-screen text area for the purpose of the description.

As illustrated in FIG. 8, it is assumed that the moving image area 42 and the still image area 44 are horizontally adjacent to each other. Then, it is assumed that the display adjuster 24 needs to reduce, enlarge, or partially delete the still image area 44 in order to adjust the aspect ratio of the content image 40.

When the display adjuster 24 reduces, enlarges, or partially deletes the still image area 44, it is preferred to reduce, enlarge, or partially delete only a portion of relatively low importance in the still image area 44. In particular, the display adjuster 24 preferably changes the aspect ratio of the still image area 44 by reducing, enlarging, or partially deleting the background portion 77 in the still image area 44.

As an example, a description will be made that the still image area 44 is partially deleted. As illustrated in FIG. 9, in the case where a person portion 76 and the background portion 77 are included in the still image area 44, the display adjuster 24 sets an end (a right end in FIG. 9) of the background portion 77 as the deletion range 68 and deletes only a part of the background portion 77. In the case where only the part of the background portion 77 is deleted (reduced or enlarged) at the time when the display adjuster 24 changes the aspect ratio of the still image area 44, information on the person portion 76 of relatively high importance in the still image area 44 is not damaged.

The display adjuster 24 preferably determines the person portion 76 and the background portion 77 of the still image area 44 by image analysis. For example, preferably, a portion having a large color change rate in the still image area 44 is extracted as a contour, a portion surrounded by the contour is determined as the person portion 76 (or some article), and a portion outside the contour is determined as the background portion 77.

Figure 10:
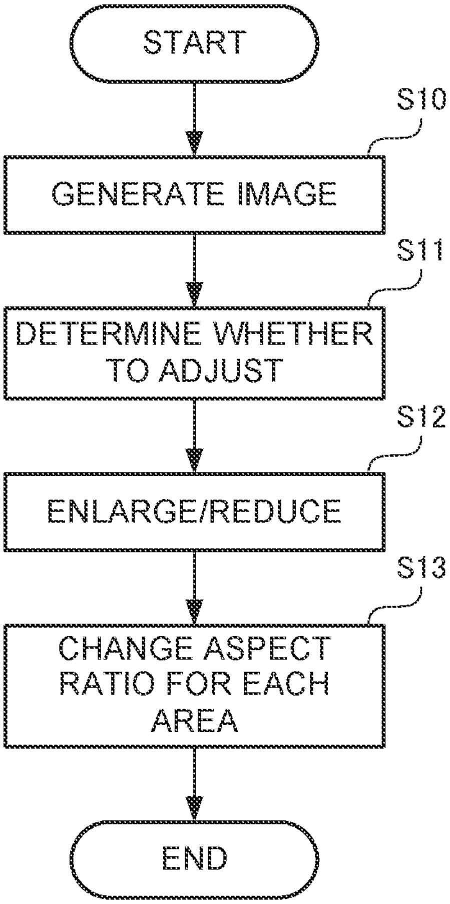
FIG. 10 is a flowchart illustrating exemplary operation by the image processing apparatus.

Next, a description will be made on an operation flow of the image processing apparatus 10 with reference to FIG. 1, FIG. 2, FIG. 4, and FIG. 10. FIG. 10 is a flowchart illustrating exemplary operation by the image processing apparatus 10. First, when the image processing apparatus 10 receives a command to display the content image 40 (START), in step S10, the image generator 22 of the controller 20 generates the content image 40 on the basis of the content data stored in the storage 12.

Then, in step S11, the display adjuster 24 of the controller 20 determines whether to adjust the aspect ratio of the content image 40 in consideration of the characteristic of the display screen 60 on which the content image 40 is to be displayed.

For example, the display adjuster 24 receives EDID information from the display 50 and checks the aspect ratio of the pixel 61 in the display screen 60. In the case where the aspect ratio of the pixel 61 is not 1:1, it is necessary to adjust the aspect ratio of the content image 40. In addition, in the case where the aspect ratio of the content image 40 differs from the aspect ratio of the display screen 60 (for example, in the case where one of the aspect ratios is 4:3 and the other aspect ratio is 16:9), it is also necessary to adjust the aspect ratio of the content image 40.

After determining whether to adjust the aspect ratio of the content image 40, in step S12, the display adjuster 24 enlarges or reduces the entire content image 40 in the vertical direction or the horizontal direction according to the characteristic of the display screen 60 (the aspect ratio of the pixel 61 or the aspect ratio of the entire display screen 60). If it is determined in step S11 that the adjustment of the aspect ratio is unnecessary, the processing in step S12 may be skipped. However, enlargement processing or reduction processing of the content image 40 with magnification of 1 (processing in which substantially no change is made) may be executed.

Then, in step S13, the display adjuster 24 changes the aspect ratio for each of the partial content areas on the basis of a display priority of each of the partial content areas. In step S13, the aspect ratio is changed for each of the partial content areas such that the aspect ratio of the content image 40 matches the aspect ratio of the display screen 60.

In step S13, the aspect ratio of the partial content area having a high adjustment priority (for example, the on-screen text area) is preferentially changed. For example, while the blank space in the on-screen text area is largely deleted, the moving image area 42 is not changed.

When the display adjuster 24 changes the aspect ratio for each of the partial content areas to make the aspect ratio of the content image 40 match the aspect ratio of the display screen 60, the image processing apparatus 10 transmits the content image 40 to the display 50 and displays the content image 40 on the display screen 60. Then, the image processing apparatus 10 waits until receiving the next command to display the content image 40 (END).

The description has been made so far on the embodiment of the present disclosure with reference to the drawings. However, the present disclosure is not limited to the embodiment described above, and can be implemented in various aspects without departing from the gist thereof. To facilitate understanding, the drawings mainly and schematically illustrate the constituent elements, and thicknesses, lengths, the numbers, intervals, and the like of the illustrated constituent elements differ from those in reality for convenience of production of the drawings. In addition, materials, shapes, dimensions, and the like of the constituent elements in the embodiment described above are merely examples, and the present disclosure is not particularly limited thereto. It is needless to say that various modifications can be made thereto without substantially departing from the configuration of the present disclosure.

The invention claimed is:

1. An image processing apparatus comprising:
at least one processor; and
at least one non-transitory computer-readable medium coupled to the at least one processor and storing one or more computer-executable instructions that, when executed by the at least one processor, cause the image processing apparatus to:
generate a content image that is displayed on a display screen and that is divided into a plurality of partial content areas;
adjust an aspect ratio of the content image;
set a predetermined adjustment priority to each of the plurality of partial content areas by setting a highest adjustment priority to a first partial content area, among the plurality of partial content areas, and setting a second highest adjustment priority to a second partial content area, among the plurality of partial content areas, that follows the first partial content area; and
adjust the aspect ratio of the content image by independently changing an aspect ratio for each of the plurality of partial content areas based on the predetermined adjustment priority.

2. The image processing apparatus according to claim 1, wherein, in a case that the aspect ratio of the content image does not match an aspect ratio of the display screen, the one or more computer-executable instructions, when executed by the at least one processor, further cause the image processing apparatus to preferentially change an aspect ratio of a partial content area, among the plurality of partial content areas, having a higher adjustment priority such that the aspect ratio of the content image matches the aspect ratio of the display screen.

3. The image processing apparatus according to claim 1, wherein
the first partial content area having the highest adjustment priority is an on-screen text area where an on-screen text image is displayed.

4. The image processing apparatus according to claim 3, wherein
the second partial content area having the second highest adjustment priority after the on-screen text area is a still image area where a still image is displayed.

5. The image processing apparatus according to claim 1, wherein the one or more computer-executable instructions, when executed by the at least one processor, further cause the image processing apparatus to change an aspect ratio of an on-screen text area that is a partial content area, among the plurality of partial content areas, where an on-screen text image is displayed, by reducing, enlarging, or partially deleting the on-screen text image in the on-screen text area.

6. The image processing apparatus according to claim 5, wherein reducing, enlarging, or partially deleting the on-screen text area comprises reducing, enlarging, or partially deleting the on-screen text image after reducing or enlarging a character size of the on-screen text image.

7. The image processing apparatus according to claim 5, wherein reducing, enlarging, or partially deleting the on-screen text area comprises reducing, enlarging, or partially deleting a blank space in the on-screen text area.

8. The image processing apparatus according to claim 1, wherein the one or more computer-executable instructions, when executed by the at least one processor, further cause the image processing apparatus to change an aspect ratio of a still image area that is a partial content area, among the plurality of partial content areas, where a still image is displayed, by reducing, enlarging, or partially deleting a background portion of the still image area.

9. The image processing apparatus according to claim 1, wherein the one or more computer-executable instructions, when executed by the at least one processor, further cause the image processing apparatus to perform aspect ratio changes for each of the plurality of partial content areas, such that a scale of the aspect ratio changes increases for each of the plurality of partial content areas with an adjustment priority higher than each of the plurality of partial content areas without the aspect ratio changes.

10. The image processing apparatus according to claim 1, wherein the one or more computer-executable instructions, when executed by the at least one processor, further cause the image processing apparatus to:

change an aspect ratio only for the first partial content area, after determining that discomfort caused to a viewer is less than a threshold and when the aspect ratio of the content image matches the aspect ratio of the display screen solely by changing the aspect ratio of the first partial content area; and change the aspect ratio for the first partial content area and an aspect ratio of the second partial content area, after determining that the discomfort caused to the viewer is more than the threshold and when the aspect ratio of the content image matches the aspect ratio of the display screen solely by changing the aspect ratio of the first partial content area.

* * * * *